United States Patent
Yang

(10) Patent No.: US 12,265,178 B2
(45) Date of Patent: Apr. 1, 2025

(54) LIDAR AND ANTI-INTERFERENCE METHOD THEREFOR

(71) Applicant: SUTENG INNOVATION TECHNOLOGY CO., LTD., Shenzhen (CN)

(72) Inventor: Shaodong Yang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 755 days.

(21) Appl. No.: 17/098,233

(22) Filed: Nov. 13, 2020

(65) Prior Publication Data

US 2021/0063538 A1    Mar. 4, 2021

Related U.S. Application Data

(63) Continuation of application No. PCT/CN2020/089140, filed on May 8, 2020.

(30) Foreign Application Priority Data

May 17, 2019 (CN) .......................... 201910410468.0

(51) Int. Cl.
*G01S 7/48* (2006.01)
*G01S 7/484* (2006.01)

(52) U.S. Cl.
CPC ............ *G01S 7/4804* (2013.01); *G01S 7/484* (2013.01)

(58) Field of Classification Search
CPC ........ G01S 7/4804; G01S 7/484; G01S 17/10; G01S 7/495; G01S 17/08
See application file for complete search history.

(56) References Cited

U.S. PATENT DOCUMENTS

| 2018/0059220 A1* | 3/2018 | Irish ........................ G01S 17/10 |
| 2018/0081041 A1* | 3/2018 | Niclass ................. G01S 17/894 |
| 2022/0035011 A1* | 2/2022 | Pacala ................... G01S 17/931 |

FOREIGN PATENT DOCUMENTS

CN    109521435 A    3/2019

OTHER PUBLICATIONS

First Office action issued in related Chinese Application No. 201910410468.0, dated Nov. 26, 2020, 15 pages.
Extended European Search Report issued in related European Application No. 20809106.6, dated May 20, 2022, 7 pages.

* cited by examiner

*Primary Examiner* — Isam A Alsomiri
*Assistant Examiner* — Sanjida Naser
(74) *Attorney, Agent, or Firm* — BAYES PLLC

(57) ABSTRACT

A lidar, and an anti-interference method therefor, may modulate a transmitting time of the lidar by injecting random time jitter at a time interval in a sequence of the transmitting time, and cause the lidar to transmit a laser pulse according to a modulated transmitting time. When an echo received by the lidar includes an expected echo of the local lidar and an unexpected echo from other lidars, because the transmitting time and the expected receiving time of the echo are correlated, injecting random time jitter in the transmitting time of the lidar may disrupt the correlation between the transmitting time of the local lidar and the transmitting time of other lidars. Thus, when a plurality of lasers are used together in one scenario and cause crosstalk, the anti-interference method for the lidar above can be used to fight against crosstalk to some extent.

20 Claims, 8 Drawing Sheets

LIDAR AND ANTI-INTERFERENCE METHOD THEREFOR

The present application claims priority from Chinese Patent Application No. CN 201910410468.0 filed before the CNIPA on May 17, 2019, which is entitled "LIDAR AND ANTI-INTERFERENCE METHOD THEREFOR" and is incorporated herein by reference in its entirety.

TECHNICAL FIELD

The present disclosure relates to the technical field of lidar, in particular to a lidar and an anti-interference method for the lidar.

BACKGROUND

Lidar ranging is based mainly on analysis of return time of pulses transmitted from the lidar itself, for example in the case of a pulsed lidar. In order to ensure safety of human eyes and detection efficiency of lidars, a designed pulse is typically a unified single pulse or a finite sequence of encoded pulse. However, when a plurality of lidars are used in the same scenario, especially when they all use a single pulse to transmit laser, all these devices would transmit pulses with similar or even identical profiles, making it difficult to distinguish from each other and easy to cause crosstalk.

SUMMARY

In view of the above, it is necessary to provide a lidar and an anti-interference method therefor.

An anti-interference method for lidar comprises:

Modulating a transmitting time of the lidar by injecting random time jitter at a time interval in a sequence of the transmitting time;

Transmitting a laser pulse by the lidar according to a modulated transmitting time;

Acquiring a receiving time of an echo received by the lidar, the echo comprising an expected echo and an unexpected echo of the local lidar, the unexpected echo comprising echoes of other lidars due to crosstalk therewith; and Identifying and removing interference echoes according to correlation between a transmitting time of the local lidar and a receiving time of an echo received by the local lidar.

In one of the embodiments, the random time jitter as injected is pseudo-random time jitter.

In one of the embodiments, the step of modulating a transmitting time of the lidar by injecting random time jitter at a time interval in a sequence of the transmitting time comprises:

Establishing a transmission timing strategy of the lidar, to determine the transmitting time of the lidar;

Establishing a pseudo-random jitter strategy of the lidar based on the transmission timing strategy; and Modulating the transmitting time of the lidar by injecting pseudo-random time jitter at the time interval in the sequence of the transmitting time of the lidar, so as to re-determine the transmitting time of the lidar.

In one of the embodiments, the lidar comprises more than two lidars and are all used in the same scenario;

The step of injecting random time jitter at the time interval in the sequence of the transmitting time is to inject pseudo-random time jitter at time intervals in sequences of transmitting times of each lidar, and the pseudo-random time jitters as injected for each lidar are different.

In one of the embodiments, the unexpected echoes further comprise echoes received correspondingly when the local lidar transmits laser due to sporadic interference thereof.

In one of the embodiments, the step of identifying interference echoes according to correlation between a transmitting time of the local lidar and a receiving time of an echo received by the local lidar comprises:

Performing ranging on the basis of the transmitting time of the local lidar and the receiving time of echoes received by the local lidar; and Statistically analyzing a ranging sequence to acquire a spatial correlation thereof, and identifying an interference ranging sequence whose spatial correlation is lower than a preset value and identifying an echo corresponding to the interference ranging sequence as an interference echo.

In one of the embodiments, it further comprises the step of performing laser pulse coding on the lidar to modulate the laser pulse of the lidar, wherein the injecting random time jitter at a time interval in a sequence of the transmitting time is used to modulate the transmitting time of the lidar after the coding.

In one of the embodiments, the step of transmitting a laser pulse by the lidar according to a modulated transmitting time is to use a multiple-pulses transmitting mechanism to transmit the laser pulse.

The anti-interference method for the lidar as mentioned above modulates a transmitting time of the lidar by injecting random time jitter at a time interval in a sequence of the transmitting time, and causes the lidar to transmit a laser pulse according to a modulated transmitting time. As such, regarding the case when an echo received by the lidar comprises an expected echo of the local lidar and an unexpected echo from other lidars: because the transmitting time and the expected receiving time of the echo are always in correlation, no matter whether random time jitter is injected or not, and injecting random time jitter in the transmitting time of the lidar may disrupt the correlation between the transmitting time of the local lidar and the transmitting time of other lidars; accordingly, in the case that a plurality of lasers are used together in one scenario and causes crosstalk, the anti-interference method for the lidar above can be used to fight against crosstalk to some extent.

Also provided is A lidar, wherein the lidar comprises: a controller, a transmitting module and a receiving module; wherein the controller is respectively connected to the transmitting module and the receiving module;

The controller is configured to modulate a transmitting time of the lidar by injecting random time jitter at a time interval in a sequence of the transmitting time, and cause the transmitting module to transmit a laser pulse according to a modulated transmitting time;

The receiving module is configured to acquire a receiving time of an echo received by the lidar, the echo comprising an expected echo and an unexpected echo of the local lidar, the unexpected echo comprising echoes of other lidars due to crosstalk therewith; and The controller is further configured to identify and remove interference echoes according to correlation between a transmitting time of the local lidar and a receiving time of an echo received by the local lidar.

In an embodiment, the controller comprises an FPGA or an ASIC.

The lidar as mentioned above modulates a transmitting time of the lidar by injecting random time jitter at a time interval in a sequence of the transmitting time, and causes the lidar to transmit a laser pulse according to a modulated transmitting time. As such, regarding the case when an echo received by the lidar comprises an expected echo of the local lidar and an unexpected echo from other lidars: because the transmitting time and the expected receiving time of the echo are always in correlation no matter whether random time jitter is injected or not, and injecting random time jitter in the transmitting time of the lidar may disrupt the correlation between the transmitting time of the local lidar and the transmitting time of other lidars; accordingly, in the case that a plurality of lasers are used together in one scenario and causes crosstalk, the lidar above can be used to fight against crosstalk to some extent.

DETAILED DESCRIPTION

In order to make the objectives, technical solutions and advantages of the present invention clear and definite, the present invention will be further described in detail below in conjunction with the accompanying drawings and embodiments. It should be understood that the specific embodiments described herein are only used to explain the present invention, and are not intended to limit the present invention.

Figure 1:
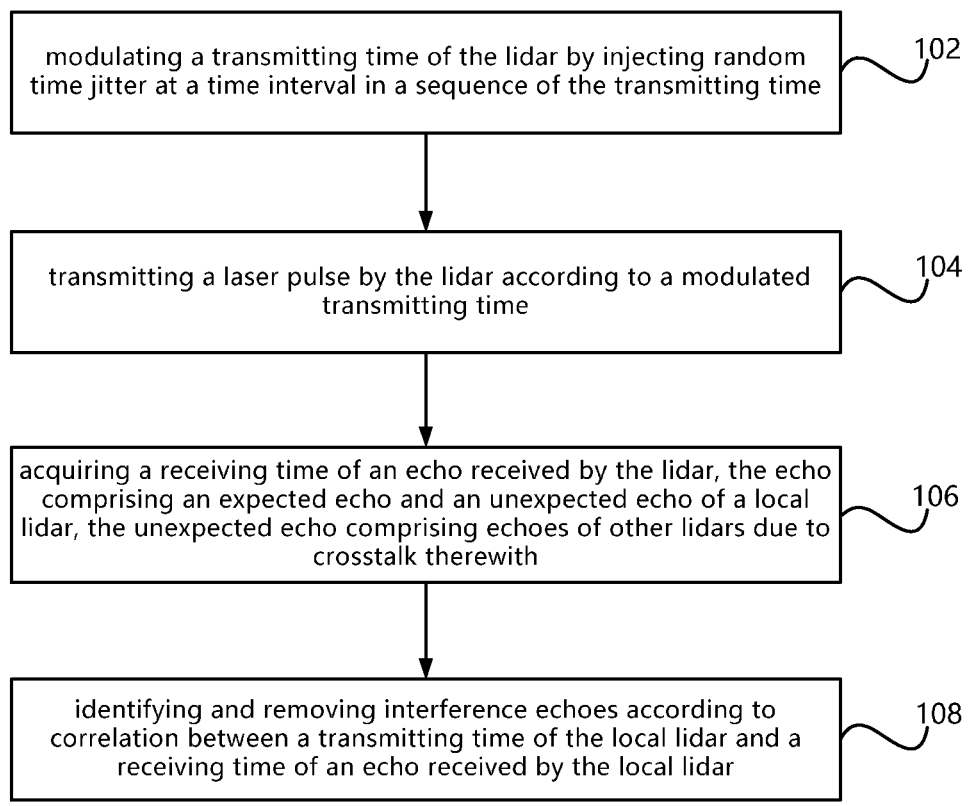
FIG. 1 is a schematic flowchart of an anti-inference method of lidar in an embodiment.

An embodiment of the present application provides an anti-interference method for a lidar. The lidar may be a pulsed lidar, such as a TOF (Time Of Flight) lidar. The following uses injected pseudo-random time jitter as an example to describe the anti-interference method for the lidar in the embodiment of the present application. FIG. 1 is a schematic flowchart of an anti-inference method for the lidar in an embodiment. Please refer to FIG. 1, the method comprises steps 102 to 108:

At step 102, a transmitting time of the lidar is modulated by injecting random time jitter at a time interval in a sequence of the transmitting time.

Figure 2:
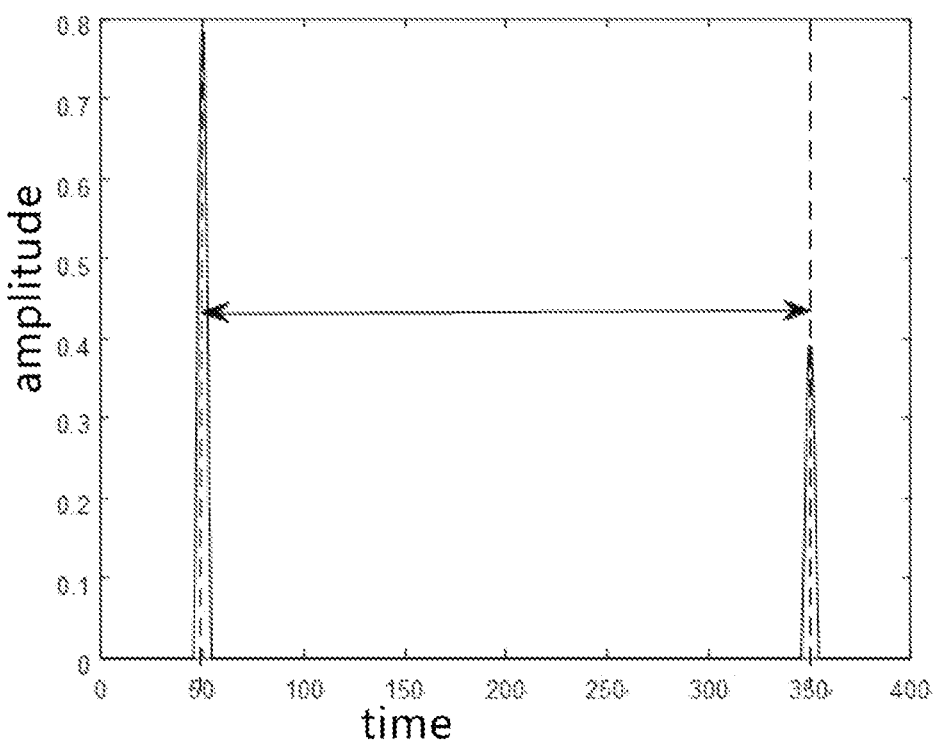
FIG. 2 is a schematic diagram of transmitting and receiving effects of a lidar in a specific embodiment.

As shown in FIG. 2, FIG. 2 shows a certain transmitting time point of the lidar, and the transmitting time point is the 50th ms. The transmitting time of the lidar can be a time sequence, that is, there are more than two transmitting time points, and the injection of pseudo-random time jitter is to insert time points at each time interval in the sequence of the transmitting time. The corresponding jitter amounts of these inserted time points at the original transmitting time points are defined as the pseudo-random time jitter. Specifically, the transmitting time interval may be fixed.

Figure 3:
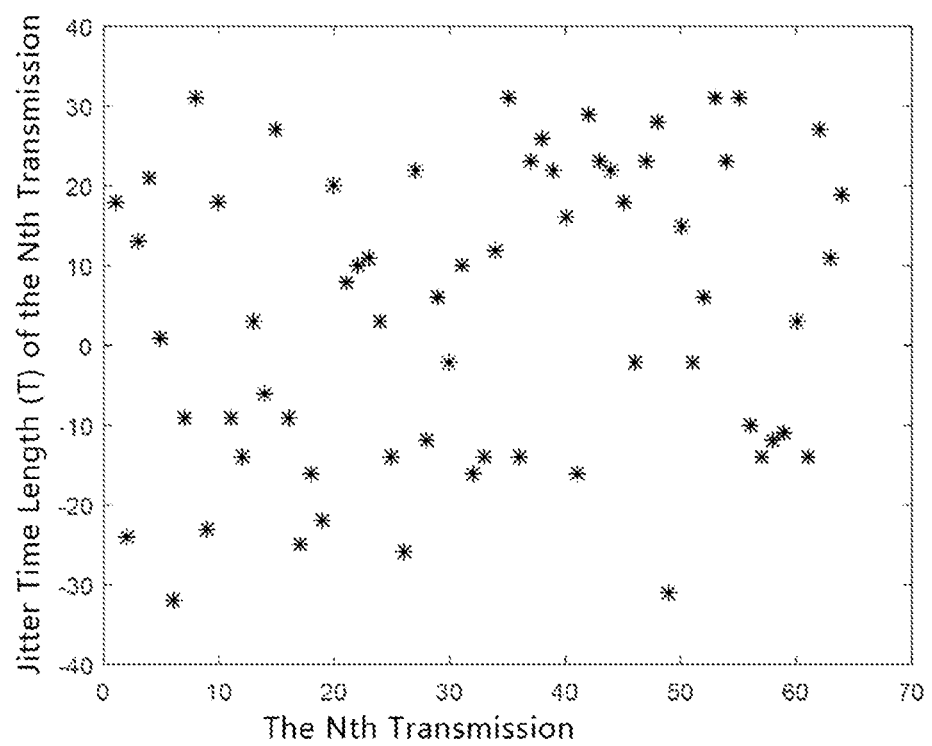
FIG. 3 is a schematic diagram of a pseudo-random time jitter sequence generated in a specific embodiment.

In one of the embodiments, the step 102 comprises: establish a transmission timing strategy of the lidar to determine the transmitting time of the lidar; then establish a pseudo-random jitter strategy of the lidar based on the transmission timing strategy; and then modulate the transmitting time of the lidar by injecting pseudo-random time jitter at the time interval in the sequence of the transmitting time of the lidar, so as to re-determine the transmitting time of the lidar. Subsequent lidars transmit lasers according to the transmitting time injected with pseudo-random time jitter, that is, the lidar also transmits lasers at each pseudo-random time point. FIG. 3 is a pseudo-random time jitter strategy established based on the 1st to Nth transmitting times of the lidar in a specific embodiment, and the vertical ordinate indicates the injected pseudo-random time jitter amount, that is, how much time it leads or lags relative to the corresponding transmitting time, where the time unit can be milliseconds. For example, −20 milliseconds indicates that the injected pseudo-random time amount is 20 milliseconds ahead of a certain transmitting time, and 20 milliseconds indicates that the injected pseudo-random time jitter is delayed relative to a certain transmitting time by 20 milliseconds.

For the lidar to perform anti-interference in the embodiment of the present application, there can be more than two lidars provided in the same scenario, that is, each lidar in the same scenario may counteract interference of other lidars. "The same scenario" can specifically refer to more than two lidars located in the same geographic area, or refer to more than two lidars performing ranging on the same object. For different lidars, when establishing a pseudo-random jitter strategy, random jitter patterns therefor are different or seeds for generating random numbers are different, that is, the injected pseudo-random time jitters of different lidar are different. A subsequent step is to make each lidar transmit laser according to the transmitting time injected with a respective pseudo-random time jitter, and can achieve that more than two lidars in the same scenario counteract the interference of multiple lidars at the same time. For example, in the case that there are Device A, Device B and Device C in the same scenario, where Device A counteracts the crosstalk of Device B and Device C, Device B counteracts the crosstalk of Device A and Device C, and Device C counteracts the crosstalk of Device A and Device B. Because the injected pseudo-random time jitter of each device is different, the jitter of the local lidar regarding transmitting time of each device is different from the jitter of the echo times of other lidars, as such, for each device, the correlation of transmitting time of the local lidar and the echo time of other lidars is disrupted. Accordingly, it is possible to make the three lidars counteract interference from multiple lidars simultaneously.

If the selected seeds are different, the pseudo-random sequence would also be different, therefore, in this embodiment: different seeds can be selected to implement injection of different pseudo-random time jitter. Compared with typical random jitters, a pseudo-random time jitter is easier to achieve different transmitting jitter amounts for different lidars.

At step 104, the laser pulses are transmitted by the lidar according to a modulated transmitting time.

In this step, the transmitting time injected with pseudo-random time jitter is the re-determined transmitting time.

At step 106, a receiving time of an echo received by the lidar is acquired, the echo comprising an expected echo and an unexpected echo of the local lidar, the unexpected echo comprising echoes of other lidars due to crosstalk therewith. In particular, the unexpected echo may further comprise echoes received correspondingly when the local lidar transmits laser due to sporadic interference thereof. The local lidar is the one that needs to remove the interference echo, for example, where there are Device A, Device B and Device C in the same scenario, the lidar that needs to counteract interference is Device A, then the local lidar is Device A, and the Device B and Device C are other lidars.

For each lidar, the echo receiving time of local lidar is the receiving time corresponding to the laser transmitting time of the local lidar, and the receiving time of echoes of other lidars is the receiving time of the echoes of other lidars received by the local lidar.

Specifically, the received echoes are all meaningful echoes. Meaningful echoes may be echoes satisfying certain amplitudes or certain pulse widths, and the receiving time of each echo may be the time when each echo peak appears.

Figure 4:
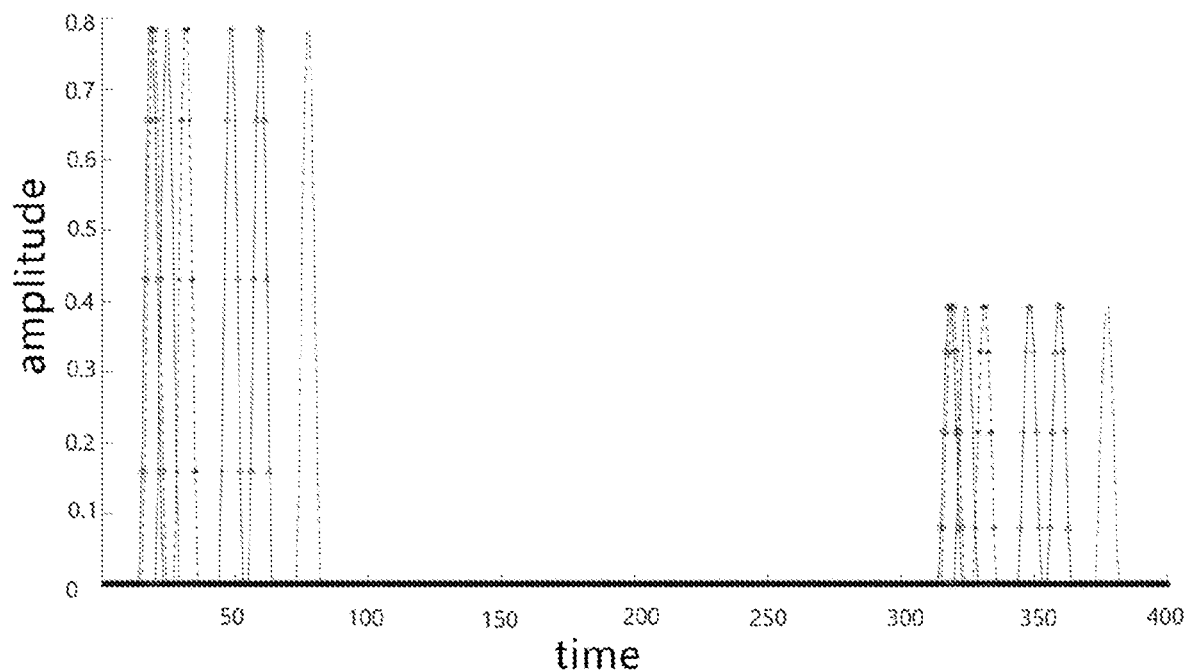
FIG. 4 is a schematic diagram of transmitting and receiving effects of laser pulses after a transmitting time is injected with a pseudo-random time jitter in a specific embodiment.
Figure 5:
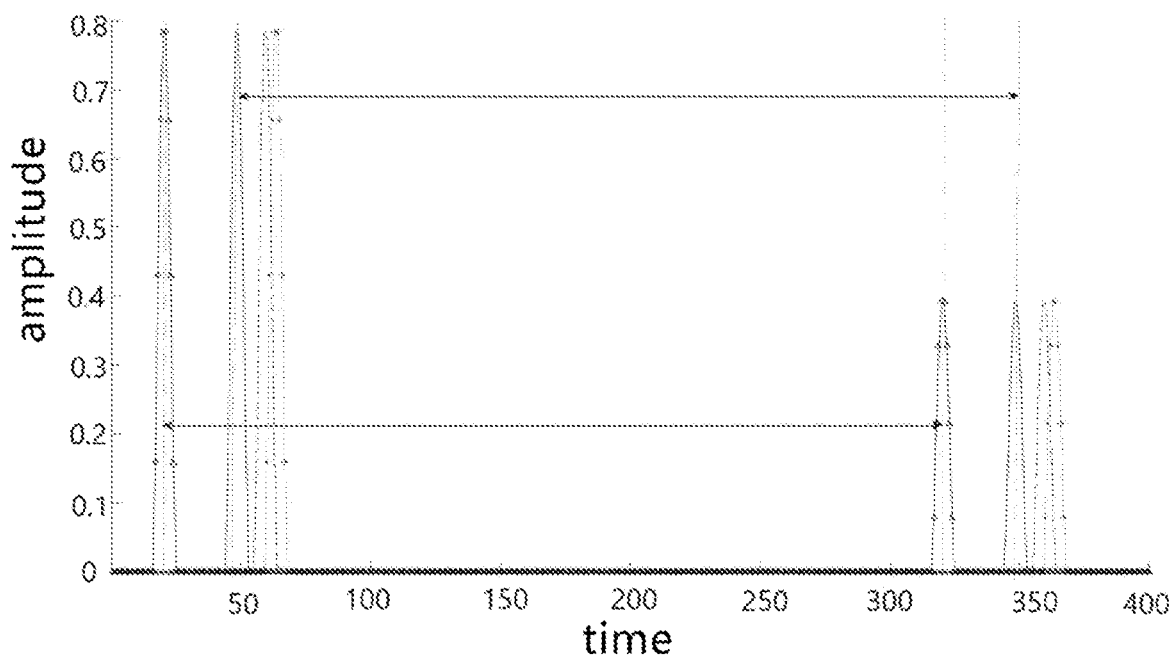
FIG. 5 is a schematic diagram of transmitting and receiving effects of laser pulses after a transmitting time is injected with a pseudo-random time jitter in another specific embodiment.

Referring to FIG. 4, which is a schematic diagram showing part of transmitting times and local lidar echo receiving times after transmission of laser pulses, in the case that the time interval in the lidar transmitting time sequence is injected with the pseudo-random time jitter as shown in FIG. 3. In FIG. 4, the lines in different formats show different times of receiving and transmitting laser pulses. Because transmitting time of the lidar is injected with pseudo-random time jitter, there would also be a corresponding pseudo-random time jitter for the receiving time of the echo of the local lidar. As such, the time-difference between the transmitting time of the lidar and the echo receiving time of the local lidar remains unchanged, as compared with the case where the pseudo-random time jitter is not added. FIG. 5 is also a schematic diagram showing part of transmitting times and local lidar echo receiving times after transmission of laser pulses, in the case that the time interval in the lidar transmitting time sequence is injected with the pseudo-random time jitter as shown in FIG. 3. In FIG. 5, the lines in different formats indicate different times of receiving and transmitting laser pulses. It can be seen from FIG. 5 that, difference between each laser receiving time and laser transmitting time remain unchanged. As such, regarding transmitting time of the lidar and the echo receiving time of the local lidar, the schematic diagram of the transmitting and receiving effects can be equalized to FIG. 2.

At step 108, interference echoes are identified and removed according to correlation between a transmitting time of the local lidar and a receiving time of an echo received by the local lidar.

The interference echoes removed in this step comprise at least interference echoes of other lidars. For the case where the unexpected echoes further comprise echoes received correspondingly when the local lidar transmits laser due to sporadic interference thereof, the interference echoes removed in this step comprise interference echoes of other lidars and a sporadic interference echo of the local lidar.

Specifically, an abnormal point detection algorithm may be used to identify the interference echo. Specifically, a removal algorithm may be used to remove the interference echo.

In one of the embodiments, the step 108 comprises: acquiring a sequence of time differences based on the transmitting time of the local lidar and the receiving time of the received echo, statistically analyzing the time differences to acquire a spatial correlation thereof, and identifying an echo corresponding to an interference time difference whose spatial correlation is lower than a preset value as an interference echo; the time difference sequence comprises an inherent time difference between the transmitting time of the local lidar and the receiving time of the local lidar echo, and an interference time difference between the transmitting time of the local lidar and the receiving times of the echoes of other lidars, and even comprises an interference time difference between the transmitting time of the local lidar and the sporadic interference echo time of the local lidar. In the present embodiment, although the transmitting time of the local lidar is injected with the pseudo-random time jitter, the time difference sequence of the transmitting time of the local lidar and the receiving time of the echo of the local lidar is still fixed; however, because the transmitting time of the local lidar is injected with pseudo-random jitter, the distribution of time difference between the transmitting time of the local lidar and the receiving time of the echo of the local lidar is at random. As such, the pseudo-random time jitter has disrupted the correlation of the time difference between the transmitting time of the local lidar and the receiving times of the echoes of other lidars.

In this embodiment, the transmitting time of the lidar has jitter, and for the same reason, the receiving time for a corresponding echo of the local lidar also has a corresponding jitter. If an object to be ranged keeps non-moving, the time difference between each group of transmitting time and receiving time of the local lidar will be fixed, and the correlation is high; otherwise, if the time difference between the transmitting time of the local lidar and the receiving times of the echoes of other lidars will be non-fixed, and the correlation between the transmitting time of the local lidar and the receiving times of the echoes of other lidars is disrupted.

In one of the embodiments, the step 108 comprises: performing ranging on the basis of the transmitting time of the local lidar and the receiving time of echoes received by the local lidar to acquire a ranging sequence, statistically analyzing the ranging sequence to acquire a spatial correlation thereof, identifying an interference ranging sequence whose spatial correlation is lower than a preset value, and identifying an echo corresponding to the interference ranging sequence as an interference echo and removing the interference echo. In the present embodiment, because the transmitting time is injected with pseudo-random time jitter, distribution of the time difference between the transmitting time and the receiving times of the echoes of other lidars is at random, the correlation of the interference time difference between the transmitting time of the local lidar and the receiving time of the echo of the other lidar is disrupted, accordingly, the correlation of the interference ranging sequence obtained on the basis of the interference time difference is also disrupted, and thus the obtained ranging sequence also include ranging sequences with a low correlation. In essential, the present embodiment identifies interference of other lidars on the basis of correlation of time differences.

Figure 6:
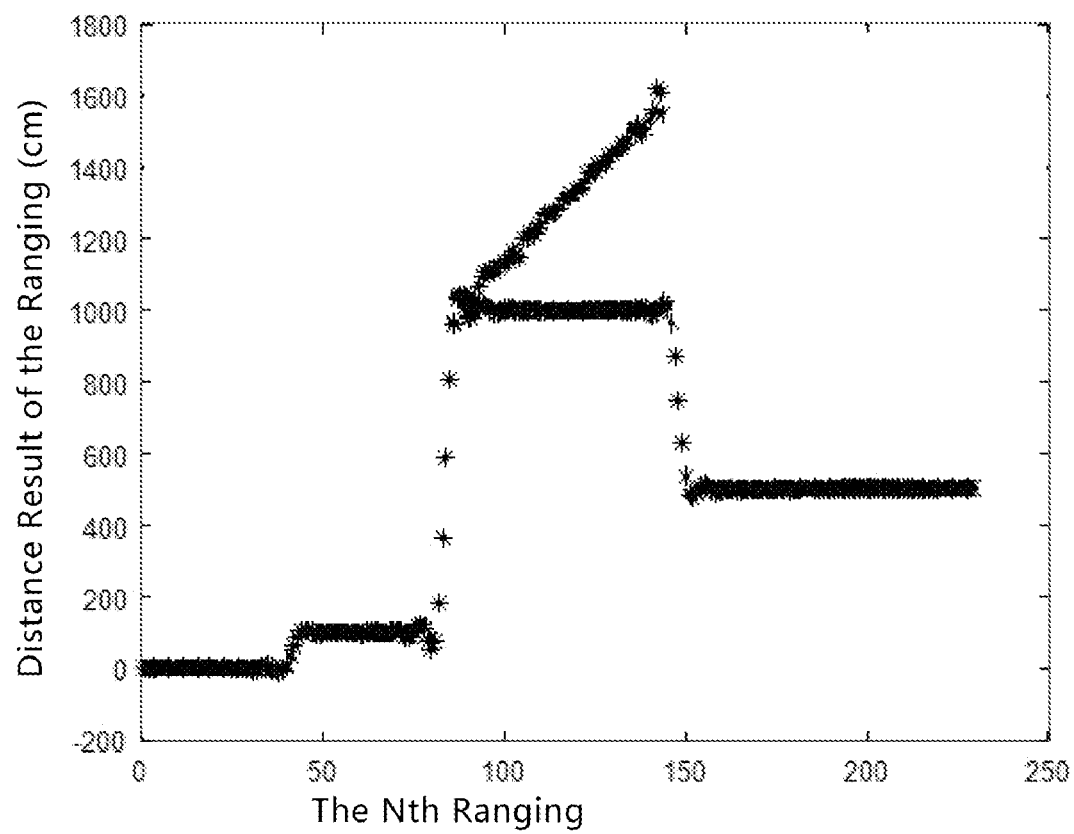
FIG. 6 is a schematic diagram of ranging effects in the case where a transmitting time interval in a lidar is not injected with a pseudo-random time jitter in a specific embodiment.
Figure 7:
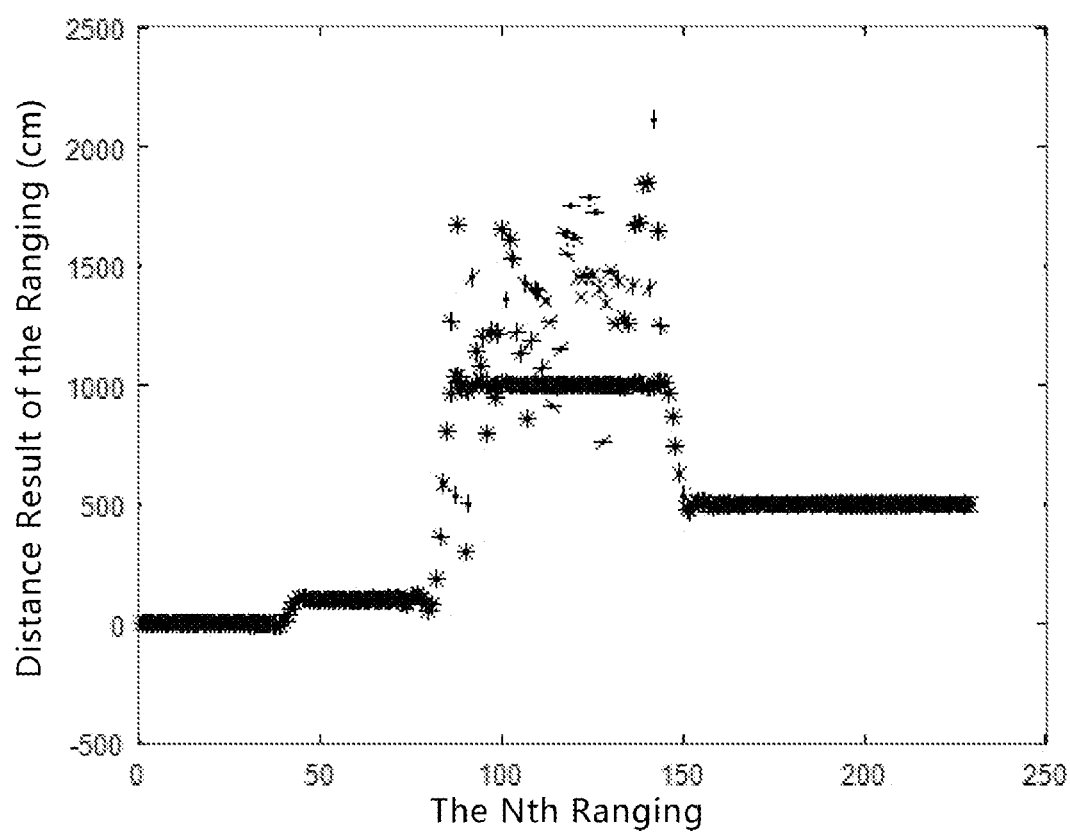
FIG. 7 is a schematic diagram of ranging effects in the case where a transmitting time interval in a lidar is injected with a pseudo-random time jitter in a specific embodiment.
Figure 8:
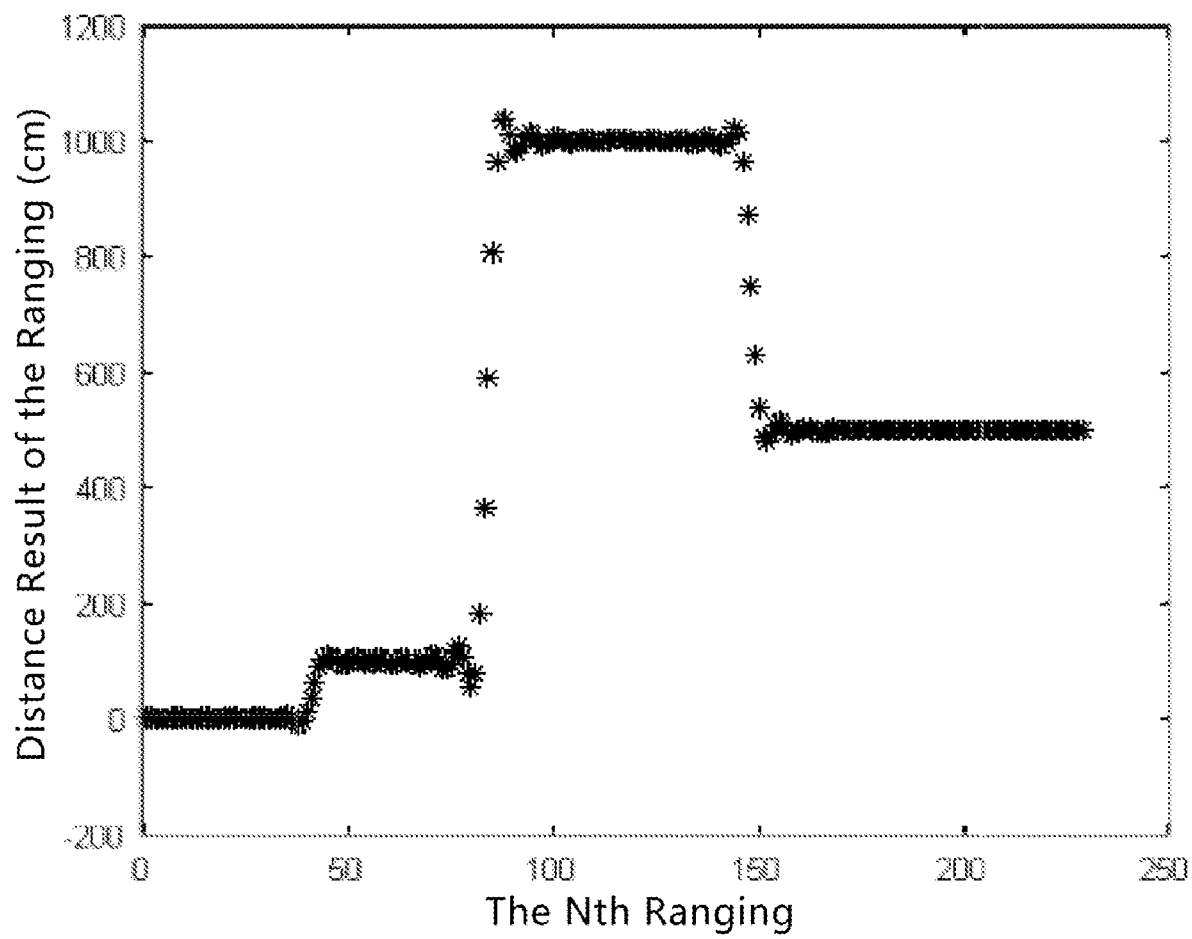
FIG. 8 is a schematic diagram of ranging effects after ranging sequences with lower correlation are removed in a specific embodiment.

N-times Ranging Sequence Result Diagrams as shown in FIG. 6 and FIG. 7 are respectively acquired by not injected with pseudo-random time jitter and injected with pseudo-random time jitter. It can be seen from FIG. 6 that the time intervals in the sequence of the transmitting time are not injected with pseudo-random time jitter, and the ranging sequences acquired are all correlated, and thus it is difficult to determine which interference ranging sequences are resulted from interference echoes of other lidars. In FIG. 7, because the time intervals in the sequence of the transmitting time are injected with the pseudo-random time jitter, the correlation of the time difference between the transmitting time of the local lidar and the receiving time of echoes of other lidars is disrupted, therefore, the acquired ranging sequences also include ranging sequences with a low correlation. These ranging sequence with a low correlation include interference ranging sequences resulted from interference echoes of other lidars. Then, these ranging sequence with a low correlation are removed, and a ranging sequence as shown in FIG. 8 is acquired.

In the case that the lidar comprises more than two lidars in the same scenario, if it is aware that only one of the lidars needs anti-interference, then it may be configured that time intervals of the sequences of transmitting times of each lidar are all injected with pseudo-random time jitter and the injected pseudo-random time jitters of each lidar are different. It may also be configured that only time intervals of a sequence of transmitting time of the lidar(s) which needs anti-interference are injected with pseudo-random time jitter, while time-intervals of sequences of transmitting times of other lidars are not injected with pseudo-random time jitter. It may also be configured that only time intervals of a sequence of transmitting time of one lidar are not injected with pseudo-random time jitter, while time-intervals of sequences of transmitting times of other lidars are injected with pseudo-random time jitters, wherein the pseudo-random time jitters injected by other lidars are different. The above mentioned modes can let time differences between transmitting time of the local lidar and receiving time of echoes of other lidars be non-fixed, and the correlation of time difference between the transmitting time of the local lidar and the receiving time of the echo of other lidars is disrupted; then, the time difference whose correlation has been disrupted is identified, and the echoes corresponding to the time difference are determined as the interference echoes of other lidars.

Traditional interference countermeasure strategies for multiple lidars adopt pulse code transmitting strategy or multiple-pulses transmitting strategy. Regarding the pulse code transmitting strategy, however, due to hardware limitation of the lidar itself, it cannot guarantee that pulse code transmitted laser reach a light output threshold, and light output efficiency and ranging efficiency of the lidar might be reduced. Regarding the multiple-pulses transmitting strategy, it takes more time to transmit and would reduce ranging efficiency, and the lidar may rely on having a high performance. By contrast, the anti-interference method of certain embodiments of the present disclosure uses pseudo-random time jitter to fight against interference, has no conflict with the transmission mechanisms such as laser pulse coding and multiple pulse transmitting, and it is even possible to use along with laser pulse coding or multiple pulse transmitting to fight against interference. In the following, embodiments that are used along with laser pulse coding or with multiple pulse transmitting mechanisms to fight against interference will be described.

In one of the embodiments, the anti-interference method in the embodiment of the present application further comprises the step of performing laser pulse coding on the lidar to modulate the laser pulse of the lidar, wherein said injecting random time jitter at a transmitting time interval is used to modulate the transmitting time of the lidar after the coding. In another embodiment, in the anti-interference method in the embodiment of the present application, the step of transmitting a laser pulse by the lidar according to the modulated transmitting time is to use a multiple-pulses transmitting mechanism to transmit the laser pulse.

In these two embodiments, when injection of the pseudo-random jitter into the transmitting time is adopted and laser pulse coding or multiple pulse transmitting mechanisms are used at the same time to fight against interference, although the detection accuracy and detection efficiency of the lidar are compromised to a certain extent, the anti-interference performance of the lidar can be further improved.

In conclusion, the anti-interference method for the lidar in the embodiment of the present application modulates the transmitting time of the lidar by injecting random time jitter at the time interval in the sequence of the transmitting time, and then let the lidar transmit laser pulses according to the modulated transmitting time. As such, in the case that the echo received by the lidar comprise the expected echo of the local lidar and the unexpected echo of other lidar, the transmitting time and the receiving time of the expected echo are correlated no matter whether the laser transmission pulse of the local lidar is injected with random time jitter or not, but the correlation between the transmitting time of the local lidar and the receiving time of echoes of other lidars may be disrupted by the injection of random time jitter at the transmitting time of the lidar; therefore, in the case where crosstalk occur due to multiple lidars are used in the same scenario, the crosstalk can be counteracted to a certain extent with the above mentioned anti-interference method for the lidar.

Figure 9:
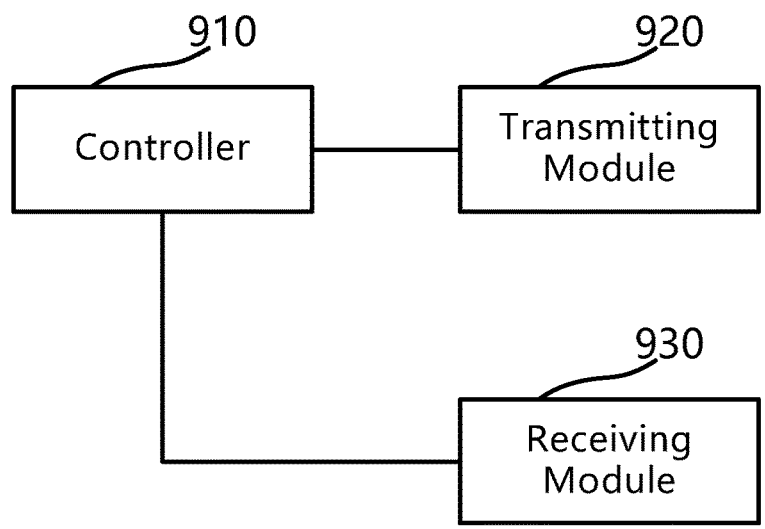
FIG. 9 is a structural schematic diagram of a lidar in an embodiment.

An embodiment of the present application also proposes a lidar. The lidar may be a pulsed lidar, such as a TOF (Time Of Flight) lidar. FIG. 9 is a schematic structural diagram of a lidar in an embodiment. Please refer to FIG. 9, the lidar comprises a controller 910, a transmitting module 920, and a receiving module 930; the controller 910 is respectively connected to the transmitting module 920 and the receiving module 930;

The controller 910 is configured to modulate a transmitting time of the lidar by injecting random time jitter at a time interval in a sequence of the transmitting time, and cause the transmitting module 920 to transmit laser according to a modulated transmitting time;

The receiving module 930 is configured to acquire a receiving time of an echo received by the lidar, the echo comprising an expected echo and an unexpected echo of the local lidar, the unexpected echo comprising echoes of other lidars due to crosstalk therewith; and The controller 910 controller is further configured to identify and remove interference echoes according to correlation between a transmitting time of the local lidar and a receiving time of an echo received by the local lidar.

Figure 10:
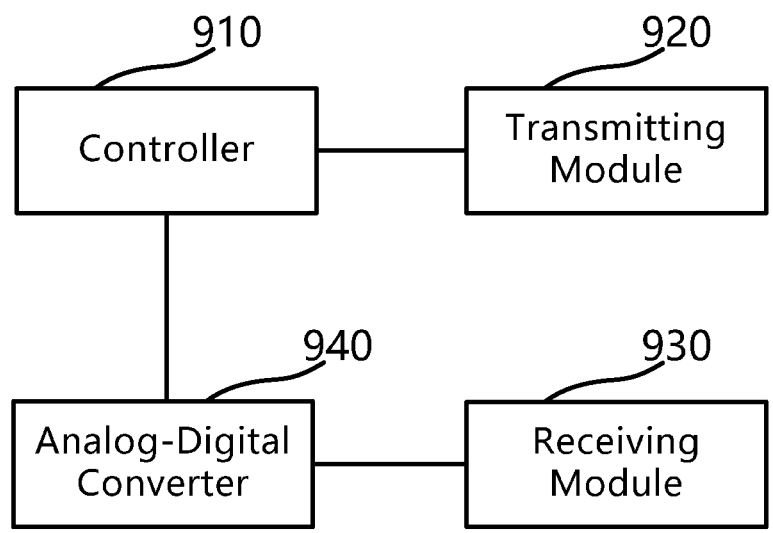
FIG. 10 is a structural schematic diagram of a lidar in another embodiment.

Specifically, please refer to FIG. 10, the lidar further comprises an analog-to-digital converter 940, and the controller 910 is connected to the receiving module 930 via the analog-to-digital converter 940. The receiving module 930 acquires the echo received by the lidar, and transforms the receiving time of the echo into a numerical sequence, and forwards the same to the controller 910.

Specifically, the controller 910 comprises a Field Programmable Gate Array (FPGA for short) or an Application Specific Integrated Circuit (ASIC for short). In other embodiments, the controller 910 further comprises an ARMCPU (Advanced RISC Machines Central Processing Unit, an embedded processor), a PC (personal computer), a DSP (Digital Signal Processing, digital signal processor), or an MCU (Micro controller Unit, micro controller unit).

For the lidar in the embodiment of the present application, the controller 910 modulates the transmitting time of the lidar by injecting random time jitter at the time interval in the sequence of the transmitting time; and then makes the transmitting module 920 transmit laser pulses according to the modulated transmitting time. As such, in the case that the echo received by the lidar comprise the expected echo of the local lidar and the unexpected echo of other lidar, the transmitting time and the receiving time of the expected echo are correlated no matter whether the laser transmission pulse of the local lidar is injected with random time jitter or not, but the correlation between the transmitting time of the local lidar and the receiving time of echoes of other lidars may be disrupted by the injection of random time jitter at the transmitting time of the lidar; therefore, in the case where crosstalk occur due to multiple lidars are used in the same scenario, the crosstalk can be counteracted to a certain extent with the above mentioned anti-interference method for the lidar.

The technical features of the above-mentioned embodiments can be arbitrarily combined. For simplicity of the description, not all possible combinations of the technical features in the above-mentioned embodiments are described. However, as long as there is no contradiction in the combinations of these technical features, all of them should be considered as within the scope of this description.

Although only a few implementations of the present invention are described in the embodiments above in a specific and detailed way, they are not to be construed as limiting the patent scope of the invention. It should be noted that, those of ordinary skill in the art can also make several modifications and improvements without departing from the concept of the present invention, which all fall within the protection scope of the present invention. Therefore, the protection scope of the invention patent shall be subject to the appended claims.

The invention claimed is:

1. An anti-interference method for a lidar, comprising:
   modulating a transmitting time of the lidar by injecting random time jitter at a time interval in a sequence of the transmitting time,
   wherein:
     the random time jitter as injected comprises an injected time amount with respect to the transmitting time; and
     the injected time amount comprises how much time the random time jitter leads or lags relative to the transmitting time, a positive injected time amount indicates that the random time jitter is delayed relative to the transmitting time and is to be injected after the transmitting time, and a negative injected time amount indicates that the random time jitter is to be injected ahead of the transmitting time;
   transmitting a laser pulse by the lidar according to a modulated transmitting time, comprising transmitting the laser pulse by the lidar according to the injected time amount comprising one of the positive injected time amount or the negative injected time amount with respect to the transmitting time;
   acquiring a receiving time of an echo received by the lidar, the echo comprising an expected echo and an unexpected echo of a local lidar, the unexpected echo comprising echoes of other lidars due to crosstalk therewith; and
   identifying and removing interference echoes according to correlation between a transmitting time of the local lidar and a receiving time of an echo received by the local lidar, which comprises:
   acquiring a sequence of time differences based on the transmitting time of the local lidar and the receiving time of the received echo, statistically analyzing the time differences to acquire a spatial correlation, and identifying an echo corresponding to an interference time difference whose spatial correlation is lower than a preset value as an interference echo; the time difference sequence comprises an inherent time difference between the transmitting time of the local lidar and the receiving time of the local lidar echo, and an interference time difference between the transmitting time of the local lidar and the receiving times of the echoes of other lidars, and further comprises an interference time difference between the transmitting time of the local lidar and a sporadic interference echo time of the local lidar.

2. The method of claim 1, wherein the random time jitter as injected is pseudo-random time jitter.

3. The method of claim 2, wherein the pseudo-random time jitter is selected by a controller of the lidar from a range of values including both positive and negative values.

4. The method of claim 1, wherein the step of modulating the transmitting time of the lidar by injecting the random time jitter at the time interval in the sequence of the transmitting time comprises:
   establishing a transmission timing strategy of the lidar, to determine the transmitting time of the lidar;
   establishing a pseudo-random jitter strategy of the lidar based on the transmission timing strategy; and
   modulating the transmitting time of the lidar by injecting pseudo-random time jitter at the time interval in the sequence of the transmitting time of the lidar, so as to re-determine the transmitting time of the lidar.

5. The method of claim 1, wherein the lidar comprises more than two lidars and the more than two lidars are all used in a same scenario; and
   the step of injecting random time jitter at the time interval in the sequence of the transmitting time is to inject pseudo-random time jitter at time intervals in sequences of transmitting times of each lidar, and the pseudo-random time jitters as injected for each lidar are different.

6. The method of claim 1, wherein the unexpected echo further comprises echoes received correspondingly when the local lidar transmits laser due to sporadic interference thereof.

7. The method of claim 1, wherein the step of identifying the interference echoes according to the correlation between the transmitting time of the local lidar and the receiving time of the echo received by the local lidar comprises:
   performing ranging on a basis of the transmitting time of the local lidar and the receiving time of echoes received by the local lidar; and
   statistically analyzing a ranging sequence to acquire a spatial correlation thereof, and identifying an interference ranging sequence whose spatial correlation is lower than a preset value and identifying an echo corresponding to the interference ranging sequence as an interference echo.

8. The method of claim 1, further comprising:
   performing laser pulse coding on the lidar to modulate the laser pulse of the lidar, wherein the injecting random time jitter at the time interval in the sequence of the transmitting time is used to modulate the transmitting time of the lidar after the coding.

9. The method of claim 1, wherein the step of transmitting the laser pulse by the lidar according to the modulated transmitting time is to use a multiple-pulses transmitting mechanism to transmit the laser pulse.

10. A lidar, wherein the lidar comprises:
a controller;
a transmitting module; and
a receiving module,
wherein the controller is respectively connected to the transmitting module and the receiving module,
wherein the controller is configured to modulate a transmitting time of the lidar by injecting random time jitter at a time interval in a sequence of the transmitting time, and cause the transmitting module to transmit a laser pulse according to a modulated transmitting time;
wherein the random time jitter as injected comprises an injected time amount with respect to the transmitting time, the injected time amount comprises how much time the random time jitter leads or lags relative to the transmitting time, a positive injected time amount indicates that the random time jitter is delayed relative to the transmitting time and is to be injected after the transmitting time, and a negative injected time amount indicates that the random time jitter is to be injected ahead of the transmitting time; and
wherein the controller is configured to cause the transmitting module to transmit the laser pulse according to the injected time amount comprising one of the positive injected time amount or the negative injected time amount with respect to the transmitting time;
wherein the receiving module is configured to acquire a receiving time of an echo received by the lidar, the echo comprising an expected echo and an unexpected echo of a local lidar, the unexpected echo comprising echoes of other lidars due to crosstalk therewith; and
the controller is further configured to identify and remove interference echoes according to correlation between a transmitting time of the local lidar and a receiving time of an echo received by the local lidar, which comprises:
acquire a sequence of time differences based on the transmitting time of the local lidar and the receiving time of the received echo, statistically analyze the time differences to acquire a spatial correlation, and identify an echo corresponding to an interference time difference whose spatial correlation is lower than a preset value as an interference echo; the time difference sequence comprises an inherent time difference between the transmitting time of the local lidar and the receiving time of the local lidar echo, and an interference time difference between the transmitting time of the local lidar and the receiving times of the echoes of other lidars, and further comprises an interference time difference between the transmitting time of the local lidar and a sporadic interference echo time of the local lidar.

11. The lidar of claim 10, wherein the controller comprises a Field Programmable Gate Array (FPGA) or an Application Specific Integrated Circuit (ASIC).

12. The lidar of claim 10, wherein the controller is configured to inject the random time jitter as pseudo-random time jitter.

13. The lidar of claim 12, wherein the controller is configured to select the pseudo-random time jitter from a range of values including both positive and negative values.

14. The lidar of claim 10 wherein the controller is configured to modulate the transmitting time of the lidar by injecting the random time jitter at the time interval in the sequence of the transmitting time by:
establishing a transmission timing strategy of the lidar, to determine the transmitting time of the lidar;
establishing a pseudo-random jitter strategy of the lidar based on the transmission timing strategy; and
modulating the transmitting time of the lidar by injecting pseudo-random time jitter at the time interval in the sequence of the transmitting time of the lidar, so as to re-determine the transmitting time of the lidar.

15. The lidar of claim 10, wherein the lidar comprises more than two lidars and the more than two lidars are all used in a same scenario; and
wherein the controller is configured to inject the random time jitter at the time interval in the sequence of the transmitting time by injecting pseudo-random time jitter at time intervals in sequences of transmitting times of each lidar, and the pseudo-random time jitters as injected for each lidar are different.

16. The lidar of claim 10, wherein the unexpected echo further comprises echoes received correspondingly when the local lidar transmits laser due to sporadic interference thereof.

17. The lidar of claim 10, wherein the controller is configured to identifying the interference echoes according to the correlation between the transmitting time of the local lidar and the receiving time of the echo received by the local lidar by:
performing ranging on a basis of the transmitting time of the local lidar and the receiving time of echoes received by the local lidar; and
statistically analyzing a ranging sequence to acquire a spatial correlation thereof, and identifying an interference ranging sequence whose spatial correlation is lower than a preset value and identifying an echo corresponding to the interference ranging sequence as an interference echo.

18. The lidar of claim 10, wherein the controller is further configured to:
perform laser pulse coding on the lidar to modulate the laser pulse of the lidar, wherein the injecting random time jitter at the time interval in the sequence of the transmitting time is used to modulate the transmitting time of the lidar after the coding.

19. The lidar of claim 10, wherein the transmitting module is configured to transmit the laser pulse by the lidar according to the modulated transmitting time by using multiple pulses to transmit the laser pulse.

20. The lidar of claim 10, wherein the lidar comprises a pulsed, time-of-flight lidar.

* * * * *